United States Patent [19]

Charbonneau et al.

[11] Patent Number: 6,063,465
[45] Date of Patent: May 16, 2000

[54] POLYESTER CONTAINER AND METHOD FOR MAKING SAME

[75] Inventors: Larry F. Charbonneau, Mendham; Robert E. Johnson, Hoboken, both of N.J.

[73] Assignee: HNA Holdings, Inc., Warren, N.J.

[21] Appl. No.: 09/086,064

[22] Filed: Apr. 23, 1998

[51] Int. Cl.⁷ .............. B29D 23/00; B32B 1/08; C08G 63/02

[52] U.S. Cl. .............. 428/36.92; 528/176; 528/189; 528/190; 528/193; 528/195; 528/298; 528/300; 528/301; 528/302; 528/307; 528/308; 528/308.6; 528/503; 428/35.7; 264/209.1; 264/210.1; 264/211.12; 264/299; 264/328.1; 264/330; 264/632; 264/634

[58] Field of Search .............. 528/176, 189, 528/190, 193, 195, 298, 300, 301, 302, 307, 308, 308.6, 503; 428/35.7, 36.92; 264/632, 634, 209.1, 210.1, 211.12, 299, 328.1, 330

[56] References Cited

U.S. PATENT DOCUMENTS

| | | |
|---|---|---|
| 2,985,995 | 5/1961 | Bunting, Jr. et al. . |
| 3,199,281 | 8/1965 | Maerov et al. . |
| 3,684,766 | 8/1972 | Jackson, Jr. et al. . |
| 3,871,947 | 3/1975 | Brekken . |
| 3,966,867 | 6/1976 | Munting . |
| 4,146,663 | 3/1979 | Ikeda et al. . |
| 4,157,419 | 6/1979 | Mirhej . |
| 4,159,617 | 7/1979 | Allan . |
| 4,195,161 | 3/1980 | Davis et al. . |
| 4,209,559 | 6/1980 | Wada et al. . |
| 4,223,128 | 9/1980 | Halek et al. . |
| 4,225,549 | 9/1980 | Allan . |
| 4,231,922 | 11/1980 | Robeson . |
| 4,246,381 | 1/1981 | Robeson . |
| 4,255,301 | 3/1981 | Minagawa et al. . |
| 4,259,458 | 3/1981 | Robeson . |
| 4,259,478 | 3/1981 | Jackson, Jr. et al. . |
| 4,294,956 | 10/1981 | Berger et al. . |
| 4,294,957 | 10/1981 | Berger et al. . |
| 4,351,917 | 9/1982 | Calundann et al. . |
| 4,352,927 | 10/1982 | Cogswell et al. . |
| 4,355,080 | 10/1982 | Zannucci . |
| 4,374,239 | 2/1983 | Berger et al. . |
| 4,383,051 | 5/1983 | Meyborg et al. . |
| 4,386,186 | 5/1983 | Maresca et al. . |
| 4,408,061 | 10/1983 | Salzburg et al. . |
| 4,413,116 | 11/1983 | Reuter et al. . |
| 4,418,174 | 11/1983 | Dhein et al. . |
| 4,435,562 | 3/1984 | Sullivan et al. . |
| 4,439,586 | 3/1984 | Kawakami et al. . |
| 4,456,729 | 6/1984 | Dhein et al. . |
| 4,474,918 | 10/1984 | Seymour et al. . |
| 4,506,066 | 3/1985 | Medem et al. . |
| 4,526,923 | 7/1985 | Hornbaker et al. . |
| 4,551,520 | 11/1985 | Morris et al. . |
| 4,557,982 | 12/1985 | Nouda et al. . |
| 4,587,071 | 5/1986 | Minami et al. . |
| 4,663,415 | 5/1987 | Grögler et al. . |
| 4,687,830 | 8/1987 | Weber et al. . |
| 4,713,436 | 12/1987 | Downs et al. . |
| 4,725,647 | 2/1988 | Maresca et al. . |
| 4,805,788 | 2/1989 | Akiho . |
| 4,814,426 | 3/1989 | Utsumi et al. . |
| 4,863,046 | 9/1989 | Collette et al. . |
| 4,993,566 | 2/1991 | Eberle . |
| 4,993,567 | 2/1991 | Eberle, Jr. . |
| 5,005,716 | 4/1991 | Eberle . |
| 5,021,289 | 6/1991 | Light et al. . |

(List continued on next page.)

FOREIGN PATENT DOCUMENTS

| | | |
|---|---|---|
| 96/38282 | 12/1996 | European Pat. Off. . |
| 96/38498 | 12/1996 | European Pat. Off. . |
| 97/00284 | 1/1997 | European Pat. Off. . |
| 1263981 | 3/1968 | Germany . |
| 195 19 577 | 5/1995 | Germany . |
| 195 19 578 | 5/1995 | Germany . |
| 195 28 336 | 8/1995 | Germany . |
| 195 04 913 | 8/1996 | Germany . |
| 195 38 700 | 4/1997 | Germany . |
| 1079686 | 8/1967 | United Kingdom . |

OTHER PUBLICATIONS

Chemical Abstracts vol. 62, col. 10588, Neth. App. 6,405, 497 (1965).

*Encyclopaedic Dictionary of Commercial Polymer Blends*, Ed. L.A. Utracki, ChemTec Publishing, pp. 10–11, 23, 35–43 (1994).

"Plastics processing," *McGraw–Hill Encyclopedia of Science & Technology*, 6ᵗʰ Edition, pp. 35–40 (1987).

"Plastics Processing," *The Way Things Work*, vol. 2, pp. 56–59 (1971).

*Polymer Alloys and Blends:Thermodynamics and Rheology*, Ed. L.A. Utracki, Hanser Publishers, pp. 256–270, 275–280, 287–293, 297–299 (1990).

*Polymeric Materials Encyclopedia*, "Polyesters (Derived from Renewable Sources)" vol. 8, pp. 5891–5896, CPC Press, Inc. (1996).

Dietrich Braun and Matthias Bergmann "1,4:3,6–Dianhydrohexite als Bausteine Für Polymere" J. prakt. Chem. 334, p. 298–310 (1992).

Hans R. Kricheldorf, "Sugar Diols' as Building Blocks of Polycondensates," J.M.S.—Rev. Macromol. Chem. Phys., C37(4), pp. 599–631 (1997).

(List continued on next page.)

*Primary Examiner*—Samuel A. Acquah
*Attorney, Agent, or Firm*—Burns, Doane, Swecker & Mathis, L.L.P.

[57] ABSTRACT

A polyester container made from a polymer having ethylene glycol moieties, isosorbide moieties and terepthaloyl moieties, and the method of making the container is described. The polyester container is suitable for holding liquids and solids, and may be hot-filled or cold-filled. In particular, wide-mouth jars and narrow-necked bottles may be formed. The polyester has an inherent viscosity of at least 0.35 dL/g when measured as a 1% (weight/volume) solution of the polyester in o-chlorophenol at a temperature of 25° C.

36 Claims, No Drawings

U.S. PATENT DOCUMENTS

| | | |
|---|---|---|
| 5,108,675 | 4/1992 | Matsuo et al. . |
| 5,120,822 | 6/1992 | Hoeschele et al. . |
| 5,124,388 | 6/1992 | Pruett et al. . |
| 5,141,120 | 8/1992 | Brown et al. . |
| 5,141,121 | 8/1992 | Brown et al. . |
| 5,153,302 | 10/1992 | Masuda et al. . |
| 5,164,478 | 11/1992 | Lee et al. . |
| 5,179,143 | 1/1993 | König et al. . |
| 5,296,550 | 3/1994 | Natarajan et al. . |
| 5,321,056 | 6/1994 | Carson et al. . |
| 5,382,474 | 1/1995 | Adhya et al. . |
| 5,409,967 | 4/1995 | Carson et al. . |
| 5,412,005 | 5/1995 | Bastioli et al. . |
| 5,484,632 | 1/1996 | Mercer, Jr. et al. . |
| 5,496,887 | 3/1996 | Braune . |
| 5,596,888 | 1/1997 | McLarty, III et al. . |
| 5,607,757 | 3/1997 | Dalton . |
| 5,616,404 | 4/1997 | Sublett . |
| 5,646,236 | 7/1997 | Schafheutle et al. . |
| 5,648,152 | 7/1997 | Diaz-Kotti et al. . |
| 5,654,083 | 8/1997 | Venema . |
| 5,656,719 | 8/1997 | Stibal et al. . |
| 5,709,929 | 1/1998 | Venema . |
| 5,721,397 | 2/1998 | Weinberg . |
| 5,747,175 | 5/1998 | Dietz et al. . |

OTHER PUBLICATIONS

Reinhard Storbeck, Matthias Rehahn and Matthias Ballauff, "Synthesis and properties of high–molecular–weight polyesters based on 1,4:3,6–dianhydrohexitols and terephthalic acid," Makromol. Chem. 194, pp. 53–64 (1993).

Reinhard Storbeck, "Synthese und Charakterisierung von Polyestern auf Basis nachwachsender Rohstoffe," Dissertation, Universität Karlsruhe, 1994.

Reinhard Storbeck and Matthias Ballauff, "Synthesis and Thermal Analysis of Copolyesters Deriving from 1,4:3, 6–Dianhydrosorbitol, Ethylene Glycol, and Terephthalic Acid," Journal of Applied Polymer Science, vol. 59, pp. 1199–1202 (1996).

POLYESTER CONTAINER AND METHOD FOR MAKING SAME

RELATED APPLICATIONS

The following copending applications, filed on even date herewith, all contain related subject matter: U.S. application Ser. Nos.: 08/064,844 filed Apr. 23, 1998 now U.S. Pat. No. 5,959,066, 08/064,846 filed Apr. 23, 1998 now U.S. Pat. No. 5,958,581, 08/064,858 filed Apr. 23, 1998, 08/064,826 filed Apr. 23, 1998, 08/064,719 filed Apr. 23, 1998, 08/064,862 filed Apr. 23, 1998 and 08/064,720 filed Apr. 23, 1998. The contents of each of the above-identified applications is hereby incorporated by reference.

FIELD OF THE DISCLOSURE

This disclosure relates to polyester containers and methods of making the same. In particular, it relates to polyester containers having an isosorbide moiety, a terephthaloyl moiety and an ethylene glycol moiety, and methods of making the same.

BACKGROUND OF THE DISCLOSURE

Plastic containers are widely used for foods and beverages, and also for non-food materials. Poly(ethylene terephthalate) (PET) is used to make many of these containers because of its appearance (optical clarity), ease of blow molding, chemical and thermal stability, and its price. PET is generally fabricated into bottles by blow molding processes, and generally by stretch blow molding.

In stretch blow molding, PET is first shaped by injection molding into a thick-walled preformed parison (a "preform"), which typically is in the shape of a tube with a threaded opening at the top. The parison may be cooled and then used later in a subsequent step, or the process may be carried out in one machine with cooling just to the stretch blow molding temperature. In the stretch blow molding step, the parison is heated to a high enough temperature in a mold to allow shaping, but not so hot that it crystallizes or melts (i.e., just above the glass transition temperature Tg, typically about 90° to 160° C.). The parison is expanded to fill the mold by rapidly stretching it mechanically in the axial direction (e.g., by using a mandrel) while simultaneously forcing air under pressure into the heated parison to expand it radially. PET is typically modified for blow molding with a small amount of comonomer, usually 1,4-cyclohexanedimethanol or isophthalic acid, which increases the width of the temperature window for successful blow molding to about 9° C. The comonomer is necessary because of the need to have a wider temperature window, and also to decrease the rate of stress induced crystallization. At the same time, the comonomer may have the undesirable effect of lowering the glass transition temperature and reducing the crystallinity of PET. Stretch blow molding of PET, and blow molding processes in general, are well known in the art. Reviews are widely available, as for example, "Blow Molding" by C. Irwin in *Encyclopedia of Polymer Science And Engineering, Second Edition*, Vol. 2, John Wiley and Sons, New York, 1985, pp. 447–478.

This technology is widely used, but there are still improvements that need to be made. First, a wider temperature window for blow molding would greatly enhance the process. Second, a material that can be filled with liquid or solid foods at higher temperatures than are currently used would significantly expand the usefulness of the bottles by allowing packaging at elevated temperatures up to 88° C., and preferably even higher, as is necessary for pasteurized foods, beverages and syrups that are too viscous to transfer without being heated. The maximum fill temperature for bottle-resin grades of PET is generally about 60° C. to 65° C. It is generally believed that a resin with a higher Tg would be better for this purpose.

PET bottles are currently modified for hot fill applications by annealing the bottles in the hot mold for a few seconds immediately after stretch blow molding. This allows PET, which is oriented during stretch blow molding, to partially crystallize before the bottle is demolded and cooled. This can be done in such a way that the crystallinity is sufficiently low and the crystallite size sufficiently small that the bottle is still transparent. The crystallites in PET bottles apparently stabilize the bottles so that they can be exposed to hot liquids, which are at a temperature of up to about 88° C., during the hot filling process without deforming. The annealing step significantly lengthens the time required to make a bottle, resulting in reduced productivity and higher costs. Therefore, a polymer which has a high Tg and low crystallinity is desirable for forming hot and cold fill containers.

The diol 1,4:3,6-dianhydro-D-sorbitol, referred to hereinafter as isosorbide, the structure of which is illustrated below, is readily made from renewable resources, such as sugars and starches. For example, isosorbide can be made from D-glucose by hydrogenation followed by acid-catalyzed dehydration.

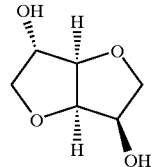

Isosorbide has been incorporated as a monomer into polyesters that also include terephthaloyl moieties. See, for example, R. Storbeck et al, *Makromol. Chem.*, Vol. 194, pp. 53–64 (1993); R. Storbeck et al, *Polymer*, Vol. 34, p. 5003 (1993). However, it is generally believed that secondary alcohols such as isosorbide have poor reactivity and are sensitive to acid-catalyzed reactions. See, for example, D. Braun et al., *J. Prakt.Chem.*, Vol. 334, pp. 298–310 (1992). As a result of the poor reactivity, polyesters made with an isosorbide monomer and esters of terephthalic acid are expected to have a relatively low molecular weight. Ballauff et al, Polyesters (Derived from Renewable Sources), Polymeric Materials Encyclopedia, Vol. 8, p. 5892 (1996).

Copolymers containing isosorbide moieties, ethylene glycol moieties, and terephthaloyl moieties have been reported only rarely. A copolymer containing these three moieties, in which the mole ratio of ethylene glycol to isosorbide was about 90:10, was reported in published German Patent Application No. 1,263,981 (1968). The polymer was used as a minor component (about 10%) of a blend with polypropylene to improve the dyeability of polypropylene fiber. It was made by melt polymerization of dimethyl terephthalate, ethylene glycol, and isosorbide, but the conditions, which were described only in general terms in the publication, would not have given a polymer having a high molecular weight.

Copolymers of these same three monomers were described again recently, where it was observed that the glass transition temperature Tg of the copolymer increases with isosorbide monomer content up to about 200° C. for the isosorbide terephthalate homopolymer. The polymer samples were made by reacting terephthaloyl dichloride in solution with the diol monomers. This method yielded a copolymer with a molecular weight that is apparently higher than was obtained in the German Patent Application described above but still relatively low when compared against other polyester polymers and copolymers. Further, these polymers were made by solution polymerization and were thus free of diethylene glycol moieties as a product of polymerization. See R. Storbeck, Dissertation, Universität Karlsruhe (1994); R. Storbeck, et al., *J. Appl. Polymer Science*, Vol. 59, pp. 1199–1202 (1996).

U.S. Pat. No. 4,418,174 describes a process for the preparation of polyesters useful as raw materials in the production of aqueous stoving lacquers. The polyesters are prepared with an alcohol and an acid. One of the many preferred alcohols is dianhydrosorbitol. However, the average molecular weight of the polyesters is from 1,000 to 10,000, and no polyester actually containing a dianhydrosorbitol moiety was made.

U.S. Pat. No. 5,179,143 describes a process for the preparation of compression molded materials. Also, described therein are hydroxyl containing polyesters. These hydroxyl containing polyesters are listed to include polyhydric alcohols, including 1,4:3,6-dianhydrosorbitol. Again, however, the highest molecular weights reported are relatively low, i.e., 400 to 10,000, and no polyester actually containing the 1,4:3,6-dianhydrosorbitol moiety was made.

Published PCT Applications WO 97/14739 and WO 96/25449 describe cholesteric and nematic liquid crystalline polyesters that include isosorbide moieties as monomer units. Such polyesters have relatively low molecular weights and are not isotropic.

SUMMARY OF THE DISCLOSURE

Contrary to the teachings and expectations that have been published in the prior art, isotropic, i.e., semi-crystalline and amorphous or nonliquid crystalline, copolyesters containing terephthaloyl moieties, ethylene glycol moieties, isosorbide moieties and, optionally, diethylene glycol moieties, are readily synthesized in molecular weights that are suitable for making fabricated products such as containers on an industrial scale. Containers made from such polyesters provide improved strength, a higher Tg and lower crystallinity, for example. In particular, containers made from such polyesters are suitable for both cold fill and hot fill applications.

The process conditions for producing a polyester container, particularly the amounts of monomers used in the polyester, are desirably chosen so that the final polymeric product used for manufacturing containers has the desired amounts of the various monomer units, preferably with equimolar amounts of monomer units derived from a diol and a diacid. Because of the volatility of some of the monomers, including isosorbide, and depending on the method of manufacture of the polyester, some of the monomers are desirably included in excess at the beginning of the polymerization reaction and removed as the reaction proceeds. This is particularly true of ethylene glycol and isosorbide.

The polyester may be formed by any method known in the art. Preferably, however, the polyester is formed by solvent or melt polymerization. The choice of method may be determined by the desired amount of diethylene glycol in the final product.

In a preferred embodiment, the number of terephthaloyl moieties in the polymer is in the range of about 25% to about 50 mole % (mole % of the total polymer). The polymer may also include amounts of one or more other aromatic diacid moieties such as, for example, those derived from isophthalic acid, 2,5-furandicarboxylic acid, 2,5-thiophenedicarboxylic acid, 2,6-naphthalenedicarboxylic acid, 2,7-naphthalenedicarboxylic acid, and 4,4'-bibenzoic acid at combined levels up to about 25 mole % (mole % of the total polymer).

In a preferred embodiment, ethylene glycol monomer units are present in amounts of about 5 mole % to about 49.75 mole %. The polymer may also contain diethylene glycol moieties. Depending on the method of manufacture, the amount of diethylene glycol moieties is in the range of about 0.0 mole % to about 25 mole %.

In a preferred embodiment, isosorbide is present in the polymer in amounts in the range of about 0.25 mole % to about 40 mole %. One or more other diol monomer units may also be included in amounts up to a total of about 45 mole %.

The polyester has an inherent viscosity, which is an indicator of molecular weight, of at least about 0.35 dL/g, as measured on a 1% (weight/volume) solution of the polymer in o-chlorophenol at a temperature of 25° C. A higher inherent viscosity, such as at least about 0.40 dL/g, preferably at least about 0.50 dL/g, is desired for optimal container formation. Further processing of the polyester may achieve inherent viscosities up to about 2.0 dL/g and even higher.

The polyester containers of the present invention are suitable for holding beverages, foods, and other solids and liquids, and may be filled with hot or cold substances. In particular, these containers offer a high Tg, increased strength and reduced crystallinity.

DETAILED DESCRIPTION OF THE INVENTION

The polyester containers and a method of manufacturing the same are described in detail below. In particular, the method of manufacturing a polyester comprising terephthaloyl moieties, ethylene glycol moieties and isosorbide is described, as well as the process of forming containers from such a polymer.

In a preferred embodiment, ethylene glycol monomer units are present in the polymer in amounts of about 28 mole % to about 49.75 mole %, preferably about 33 mole % to about 49.5 mole %, more preferably about 37 mole % to about 45 mole %, and most preferably about 41 mole % to about 49 mole %, although higher amounts may be included as necessary to achieve the desired results. The polymer composition may also contain diethylene glycol monomer units. Depending on the method of manufacture, the amount of diethylene glycol monomer units is in the range of from about 0.0 mole % to about 5.0 mole %, preferably 0.25 mole % to about 5 mole %, although higher amounts may be included as necessary to achieve the desired results. Diethylene glycol may be produced as a by-product of the polymerization process, or may be added directly to the composition to help accurately regulate the amount of diethylene glycol monomer units that are in the polymer.

In preferred embodiments, isosorbide moieties are present in the polymer in amounts in the range of from about 0.10 mole % to about 12 mole %, preferably from about 0.25 mole % to about 10.0 mole %, more preferably about 0.5 mole % to about 6.0 mole %, more preferably 1.0 mole % to 5.0 mole %, although higher amounts may be included as necessary to achieve the desired results. Isosorbide is most preferably present in the range of 1 mole % to 3 mole %. One or more other diol monomer units may optionally be included in amounts up to a total of about 5.0 mole %, preferably less than 3 mole %, most preferably less than 2 mole %. The amount of other diols included may however be higher as necessary to achieve the desired results. Examples of the optional other diol units include aliphatic alkylene glycols having from 3–12 carbon atoms and having the empirical formula HO—$C_nH_{2n}$—OH, where n is an integer from 3–12, including branched diols such as 2,2-dimethyl-1,3-propanediol; cis or trans-1,4-cyclohexanedimethanol and mixtures of the cis and trans isomers; triethylene glycol; 2,2-bis[4-(2-hydroxyethoxy)phenyl] propane; 1,1-bis[4-(2-hydroxyethoxy)phenyl] cyclohexane; 9,9-bis[4-(2-hydroxyethoxy)phenyl]fluorene; 1,4:3,6-dianhydromannitol; 1,4:3,6-dianhydroiditol; and 1,4-anhydroerythritol.

Terephthaloyl moieties in the polyester may range from 25–50 mole %, preferably about 35–50 mole %, more preferably 40–50 mole %, and most preferably 48–50 mole %, although higher amounts may be included as necessary to achieve the desired results. Other aromatic diacid moieties in the polymer, if desired, may include, for example, those derived from isophthalic acid, 2,5-furandicarboxylic acid, 2,5-thiophenedicarboxylic acid, 2,6-naphthalenedicarboxylic acid, 2,7-naphthalenedicarboxylic acid, and 4,4'-bibenzoic acid, at combined levels up to about 15 mole %, preferably less than 10 mole %, more preferably between about 0.01 mole % and 5 mole %, most preferably less than 2 mole %, although higher amounts may be included as necessary to achieve the desired results.

It is preferable that equimolar amounts of diacid monomer units and diol monomer units are present in the polymer in order to achieve a high molecular weight and high inherent viscosity, which provide a lower shrinkage rate and higher glass transition temperature (Tg) than, for example, poly (ethylene terephthalate). The polyester formed has an inherent viscosity, which is an indicator of molecular weight, of at least about 0.35 dL/g, as measured on a 1% (weight/volume) solution of the polymer in o-chlorophenol at a temperature of 25° C. Preferably, the inherent viscosity is at least about 0.45 dL/g, more preferably greater than 0.5 dL/g, even more preferably greater than 0.6 dL/g, and most preferably greater than 0.7 dL/g. The inherent viscosity may be adjusted to achieve the desired characteristics based on the composition of the polymer and the method of formation.

The molecular weight is normally not measured directly. Instead, the inherent viscosity of the polymer in solution or the melt viscosity is used as an indicator of molecular weight. For the present polymers, the inherent viscosity is measured by the method described previously, with a molecular weight corresponding to an inherent viscosity of about 0.35 dL/g or more. Higher molecular weights corresponding to inherent viscosities of at least about 0.50 dL/g are preferred, and molecular weights corresponding to inherent viscosities of about 0.7 dL/g and higher are desired for many uses. Generally, the inherent viscosity/molecular weight relationship can be fitted to the linear equation:

$$\log (IV) = 0.586 \times \log(M_w) - 2.9672.$$

The inherent viscosities are a better indicator of molecular weight for comparisons of samples and are used as the indicator of molecular weight herein.

The polyesters used to make the containers of the invention can be made by any of several methods. The product compositions vary somewhat depending on the method used, particularly in the amount of diethylene glycol residue that is present in the polymer. These methods include the reaction of the diol monomers with the acid chlorides of terephthalic acid and any other acids that may be present. The reaction of terephthaloyl dichloride with isosorbide and ethylene glycol is readily carried out by combining the monomers in a solvent (e.g., toluene) in the presence of a base, such as pyridine, which neutralizes HCl as it is produced. This procedure is described in R. Storbeck et al., J. Appl. Polymer Science, Vol. 59, pp. 1199–1202 (1996). Other well-known variations using terephthaloyl diclloride may also be used (e.g., interfacial polymerization), or merely stirring the monomers together while heating them, preferably in the presence of a base).

When the polymer is made using the acid chlorides, the ratio of monomer units in the product polymer is about the same as the ratio of reacting monomers. Therefore, the ratio of monomers charged to the reactor is about the same as the desired ratio in the product. A stoichiometric equivalent of the diol and diacid generally will be used to obtain a high molecular weight polymer suitable for making containers (e.g., an inherent viscosity of at least about 0.50–0.60 dL/g).

The polymers can also be made by a melt polymerization process, in which the acid component is either terephthalic acid or dimethyl terephthlate, and, also includes the free acid or dimethyl ester of any other aromatic diacids that may be included in the polymer composition. The diacids or dimethyl esters are heated with the diols (ethylene glycol, isosorbide, optional diols) in the presence of a catalyst to a high enough temperature that the monomers combine to form esters and diesters, then oligomers, and finally polymers. The polymeric product at the end of the polymerization process is a molten polymer. The diol monomers (e.g., ethylene glycol and isosorbide) are volatile and distill from the reactor as the polymerization proceeds. Therefore, an excess of these diols generally is charged to the reactor to obtain the desired polymer, and the amounts are adjusted according to the characteristics of the polymerization vessel (i.e. such characteristics as the efficiency of the distillation columns and the efficiency of monomer recovery and recycle). Such modifications in the amounts of monomers and the like in accordance with the characteristics of a reactor are readily made by practitioners in the art. Melt polymerization processes using hydroxyethyl esters of terephthalic acid, such as bis(2-hydroxyethyl) terephthalate, are also known and may be modified to make the polymers described herein.

The melt polymerization process is the preferred method of making the polymer and is described in detail in copending commonly assigned U.S. application Ser. No. 08/064,844, filed Apr. 23, 1998 now U.S. Pat. No. 5,959,066, filed on even date herewith, and incorporated herein by reference. The melt polymerization processes using dimethyl terephthalate and terephthalic acid are also summarized below.

Dimethyl Terephthalate Process

In this process, which is carried out in two stages, terephthalic acid and the optional diacid monomers, if present, are used as their dimethyl ester derivatives. The diols (e.g., ethylene glycol and isosorbide) are mixed with the dimethyl ester of the aromatic diacid (e.g., dimethyl terephthalate) in the presence of an ester interchange catalyst, which causes exchange of the ethylene glycol for the methyl group of the dimethyl esters through a transesterification reaction. This results in the formation of methanol, which distills out of the reaction flask, and bis (2-hydroxyethyl) terephthalate because of the stoichiometry of this reaction, somewhat more than two moles of ethylene glycol are desirably added as reactants for the ester interchange reaction. Catalysts that bring about ester interchange include salts (usually acetates) of the following metals: Li, Ca, Mg, Mn, Zn, Pb, and combinations thereof, $Ti(OR)_4$, where R is an alkyl group having 2–12 carbon atoms, and PbO. The catalyst components are generally included in an amount of about 10 ppm to about 100 ppm. Preferred catalysts for ester interchange include $Mn(OAc)_2$, $Co(OAc)_2$, and $Zn(OAc)_2$, where OAc is the abbreviation for acetate, and combinations thereof. The polycondensation catalyst which is needed for the second stage of the reaction, preferably Sb(III) or Ge(IV) oxide, may be added now or at the start of the polycondensation stage. A catalyst that has been used with particularly good success for ester interchange is based on salts of Mn(II) and Co(II) at levels of about 50 to about 100 ppm each. These were used in the form of Mn(II) acetate tetrahydrate and Co(II) acetate tetrahydrate, although other salts of the same metals may also be used.

Ester interchange is brought about by heating and stirring the mixture of reactants under an inert atmosphere (e.g., nitrogen) at atmospheric pressure from room temperature to a temperature high enough to induce the ester interchange (about 150° C.). Methanol is formed as a by-product and distills out of the reactor. The reaction is gradually heated to about 250° C. until methanol evolution stops. The end of methanol evolution can be recognized by a drop in the overhead temperature of the reaction vessel.

A small amount of an additive having a boiling point of 170–240° C. may be added to the ester interchange to aid in the heat transfer within the reaction medium and to help retain volatile components in the vessel that may sublime into the packed column. The additive must be inert and not react with alcohols or dimethyl terephthalate at temperatures below 300° C. Preferably, the additive has a boiling point greater than 170° C., more preferably within the range of 170° C. to 240° C., and is used in an amount between about 0.05 and 10 wt %, more preferably between about 0.25 and 1 wt % of the reaction mixture. A preferred additive is tetrahydronaphthalene. Other examples include diphenyl ether, diphenylsulfane and benzophenone. Other such solvents are described in U.S. Pat. No. 4,294,956, the contents of which are hereby incorporated by reference.

The second stage of the reaction is commenced by adding a polycondensation catalyst (if not already present) and a sequestering agent for the transesterification catalyst. Polyphosphoric acid is an example of a sequestering agent and is preferred. It is normally added in an amount of about 10 to about 100 ppm of phosphorous per gm of dimethyl terephthalate. Examples of preferred polycondensation catalysts are antimony (III) oxide and germanium (IV) oxide, which may be used at levels of about 100 to about 400 ppm. Germanium (IV) oxide is the most preferred polycondensation catalyst.

The polycondensation reaction is typically carried out at a temperature from about 250° C. to 285° C. During this time, ethylene glycol distills out of the reaction due to condensation of the bis(2-hydroxyethyl) terephthalate to form polymer and by-product ethylene glycol, which is collected as a distillate.

The polycondensation reaction described above is preferably carried out under vacuum, which can be applied while the reactor is being heated to the temperature of the polycondensation reaction or after either Sb(III) oxide or Ge(IV) oxide and polyphosphoric acid have been added. Alternatively, vacuum can be applied after the polycondensation reaction temperature reaches 280° C.–285° C. In either case, the reaction is accelerated by the application of vacuum. Heating under vacuum is continued until the molten polymer reaches the desired molecular weight, usually recognized by an increase in the melt viscosity to a predetermined level. This is observed as an increase in the torque needed for the stirring motor to maintain stirring at a constant rpm. An inherent viscosity of at least 0.5 dL/g, and generally up to about 0.65 dL/g or greater, can be achieved by this melt polymerization process without further efforts at raising molecular weight. For certain composition ranges the molecular weight can be increased further by solid state polymerization, described below.

Terephthalic Acid Process

The terephthalic acid process is similar to the dimethyl terephthalate process except that the initial esterification reaction that leads to bis(2-hydroxyethyl) terephthalate and other low molecular weight esters is carried out at a slightly elevated pressure (autogenous pressure, about 25 to 50 psig). Instead of a two-fold excess of diols, a smaller excess (about 10% to about 60%) of diols (ethylene glycol, isosorbide and other diols, if any) is used. The intermediate esterification product is a mixture of oligomers, since not enough diol is present to generate a diester of terephthalic acid. The catalysts are also different. No added catalyst is necessary in the esterification reaction.

A polycondensation catalyst (e.g., Sb(III), Ge(IV), or Ti(IV) salts) is still necessary to achieve a high molecular weight polymer. The catalyst that is needed to achieve a high molecular weight can be added after the esterification reaction, or it can be conveniently charged with the reactants at the beginning of the reaction. Catalysts that are useful for making a high molecular weight polymer directly from terephthalic acid and the diols include the acetate or other alkanoate salts of Sb(III), oxides of Sb(III) and Ge(IV), and $Ti(OR)_4$ (where R is an alkyl group having 2 to 12 carbon atoms). Glycol solubilized oxides of these metal salts may also be used. Co(II) salts may also be present. The use of these and other catalysts in the preparation of polyesters is well-known in the art.

The reaction may be carried out in discrete steps, but this is not necessary. In practice on a large scale, it may be carried out in steps as the reactants and intermediate products are pumped from reactor to reactor at increasing temperatures. In a batch process, the reactants and catalyst may be charged to a reactor at room temperature and then gradually heated to about 285° C. as polymer forms. The pressure is vented in the range of about 200° C. to about 250° C., and a vacuum is then desirably applied.

Esterification to form bis(2-hydroxyethyl)terephthalate esters and oligomers takes place at elevated temperatures (between room temperature and about 220° C. to 265° C. under autogenous pressure), and polymer is made at temperatures in the range of about 275° C. to about 285° C. under a high vacuum (less than 10 Torr, preferably less than 1 Torr). The vacuum is needed to remove residual ethylene glycol and water vapor from the reaction to raise the molecular weight.

A polymer having an inherent viscosity of at least 0.5 dL/g, and generally, up to about 0.65 dL/g can be achieved by the direct polymerization process, without subsequent solid state polymerization. The progress of the polymerization can be followed by the melt viscosity, which is easily observed by the torque that is required to maintain stirring of the molten polymer.

Solid State Polymerization

Polymers can be made by the melt condensation process described above having an inherent viscosity of at least about 0.5 dL/g, and often as high as about 0.65 dL/g or greater, without further treatment. For containers, a polymer having an inherent viscosity of at least about 0.6 dL/g, and preferably about 0.7 dL/g, is generally desirable to obtain containers having good tensile properties. This is especially true for soft drink bottles that must withstand internal carbon dioxide pressure. Compositions of ethylene glycol, isosorbide, and terephthalic acid having isosorbide in an amount of about 0.25% to about 10% on a mole basis may have their molecular weight increased further by solid state polymerization. The product made by melt polymerization, after extruding, cooling, and pelletizing, is essentially non-crystalline. The material can be made semi-crystalline by heating it to a temperature in the range of about 115° C. to about 140° C. for an extended period of time (about 2 to about 12 hours). This induces crystallization so that the product can then be heated to a much higher temperature to raise the molecular weight. The process works best for low levels of isosorbide, about 0.25 mole % to about 3 mole %, because the polyester crystallizes more easily with low levels of isosorbide. The polymer made by other methods can also be crystallized under these same conditions.

The polymer may also be crystallized prior to solid state polymerization by treatment with a relatively poor solvent for polyesters, such as acetone, which induces crystallization. Solvent-induced crystallization followed by solid state polymerization is known for polyesters and is described in U.S. Pat. Nos. 5,164,478 and 3,684,766, which are incorporated herein by reference.

The crystallized polymer is subjected to solid state polymerization by placing the pelletized or pulverized polymer into a stream of an inert gas, usually nitrogen, or under a vacuum of 1 Torr, at an elevated temperature, above about 140° C. but below the melting temperature, for a period of about two to about 16 hours. Solid state polymerization is preferably carried out at temperatures of about 190° C. to about 210° C. Excellent results have been obtained by heating the polymer to about 195° to about 198° C. for about 10 hours, which results in an increase in inherent viscosity to about 0.8 dL/g or higher.

Method of Fabricating Containers

The containers described herein may be made by any method known in the art, such as extrusion, injection molding, injection blow molding, rotational molding, thermoforming of a sheet, and stretch-blow molding.

In the present invention, the preferred method for molding a container is stretch-blow molding, which is generally used in the production of poly(ethylene terephthalate) (PET) containers, such as bottles. In this case, use may be made of any of the cold parison methods, in which a preformed parison (generally made by injection molding) is taken out of the mold and then is subjected to stretch blow molding in a separate step. The hot parison method as known in the art may also be used, wherein the hot parison is immediately subjected to stretch blow molding in the same equipment without complete cooling after injection molding to make the parison. The parison temperature is about 100° C. to about 160° C., and preferably, about 110° C. to about 150° C.

The stretch blow molding is preferably conducted at a mold temperature of from about 90° C. to about 150° C., and still more preferably from about 100° C. to about 135° C.

Containers of the invention may have any shape desirable, and particularly include narrow-mouth bottles and wide-mouth jars having threaded tops and a volume of about 450 ml to about 3 liters, although smaller and larger containers may be formed.

The containers can be used in standard cold fill applications and, surprisingly, can be used in hot fill applications, even at the lowest levels of isosorbide inclusion (1%), wherein the effect of isosorbide content on glass transition temperature is very small. Hot fill bottles are filled with hot liquids at temperatures greater than about 60° C., preferably up to at least about 88° C., and, ideally, at temperatures above about 88° C. The containers of the invention can withstand the hot-fill process temperatures without an annealing step, unlike PET containers, although the annealing step may be performed if desired.

The containers of the invention are suitable for foods and beverages, and other solids and liquids. The containers are normally nearly colorless and transparent, but can be modified to have color or to be opaque, rather than transparent, if desired by adding colorants or dyes, or by causing crystallization of the polymer, which results in opaqueness.

Additional additives, such as oxidation stabilizers, ultra-violet light absorbers, antistatic agents and flame retardants, may be added as desired depending on the specific end use of the container.

The containers of the present invention may also be made with the polyesters described in copending application 08/064,720 filed Apr. 23, 1998 and the polyester blends described in copending application 08/064,826 filed Apr. 23, 1998, the contents of each of which are hereby incorporated by reference.

EXAMPLES

The polymer molecular weights are estimated based on inherent viscosity (I.V.), which is measured for a 1% solution (wt./volume) of polymer in o-chlorophenol at a temperature of 25° C. The levels of catalyst components are expressed as ppm, based on a comparison of the weight of the metal with the weight of either the dimethyl terephthalate or terephthalic acid, depending on which monomer is used.

Example 1

The following polymerization reactants are added to a 100 gal. maximum capacity, stainless steel polymerization reactor fitted with a 6" radius, stainless steel, water cooled reflux column packed with stainless steel rings, a stainless steel paddle-type stirrer, a water-cooled condenser and by-pass: dimethyl terephthalate (197 kg), isosorbide (5.12 kg), and ethylene glycol (135 kg), which corresponds to a mole ratio of 1:0.0346:2.00. The catalyst is also charged and consists of Mn(II) acetate tetrahydrate (72.1 g), Co(II) acetate tetrahydrate (54.1 g), and Sb(III) oxide (88.5 g). This corresponds to 82 ppm manganese (weight of metal as a fraction of the weight of dimethyl terephthalate), 65 ppm cobalt, and 375 ppm antimony. The stirred reactor (50 rpm) is purged with a stream of nitrogen while the temperature is raised to 250° C., gradually, over a period of four hours. The reactor is jacketed and uses a temperature controlled, hot oil loop system as a heating medium. Methanol evolution commences, and methanol is continuously collected after the reaction is heated above approximately 150° C. By noting when the temperature drops at the top of the packed reflux column it is possible to determine the end of methanol evolution, indicating the finish of the first step of the reaction, which is the transesterification of the diols and dimethyl terephthalate. At this point, 82 ppm of phosphorous is added in the form of a polyphosphoric acid solution in ethylene glycol. In this case, 153 ml of the solution, which has a concentration of 0.80 wt % phosphorous, is used. Also at this time, the nitrogen purge is stopped while heating is continued. The reaction is heated to 285° C. over a period of about 2 hours. Vacuum is then gradually applied using a multi-vane vacuum pump with 20 horsepower blower. The attainment of full vacuum, preferably less than 1 Torr, takes approximately 1 hour. During this time, ethylene glycol distills off, and a low molecular weight polymer forms. The molten polymer is heated under vacuum at 285° C. for about 2 hours, until the polymer achieves sufficient melt viscosity, as determined by an increase in torque of the stirrer. When sufficient melt viscosity is achieved, the polymerization is stopped, and the polymer is emptied from the reactor through a heated die at the bottom. The molten polymer emerges as a strand that is cooled in a cold water trough and then chopped into pellets. The polymer pellets are dried overnight in a rotating drum heated to 120° C. The solution inherent viscosity (I.V.) of the material is 0.64 dL/g.

The pelletized polymer is loaded into a tumble dryer and is heated under a stream of nitrogen to 185° C. over a period of 4 hours. It is held at that temperature for another 6 hours, allowing the polymer to partially crystallize. After this treatment, a vacuum is applied to the tumble dryer, achieving a vacuum less than 1 mm of Hg. The heating is continued to a maximum temperature of 213° C., which is held for a total of approximately 15 hours. This effects a solid-state polymerization and allows the molecular weight to be significantly increased, as judged by an increase in the inherent viscosity (I.V.) of the polymer solution in orthochlorophenol to about 0.7 dL/g.

The monomer unit composition of the polymer, determined by proton NMR, is about 1% isosorbide, 49% ethylene gylcol, 0.7% diethylene glycol, and 50% terephthalic acid, all expressed as a mole % of the polymer. It is noteworthy that the amount of isosorbide in the polymer is approximately half of the amount that was charged, when compared with the amount of terephthalic acid. Unreacted isosorbide is found in the distillates, especially in the ethylene glycol. The amount of isosorbide in the polymer by this process is very dependent on the efficiency of the distillation or other separation methods that are used in the process. A skilled practitioner can readily establish specific process details according to the characteristics of the reactor, distillation columns, and the like.

Example 2

A second polymer with a greater isosorbide content was prepared in an analogous fashion as example 1 except that the amount of isosorbide charged was 17.8 kg and the amount of Mn(II) acetate tetrahydrate catalyst used was 79.2 g, corresponding to 90 ppm Mn(II), calculated on the same basis as in the above example. The transesterification and polycondensation were carried out as described above. The finished polymer was pelletized, crystallized, and solid-state polymerized by the same method as in the previous example. The change in solution viscosity upon solid-state polymerization already noted occurred in the present case. The monomer unit composition of this polymer, determined by proton NMR, shows the desired increase in isosorbide content and comprises the following monomers: about 2.6% isosorbide, 46.7% ethylene gylcol, 0.7% diethylene glycol, and 50% terephthalic acid, all expressed as a mole % of the polymer.

Example 3

The polymers of Examples 1 and 2 were made into 460 ml jars on a commercial Nissei ASB100DH Injection Single Blow stretch-blow molding unit using a one-stage stretch-blow molding process, and using a 132.5 mm rod for the stretch. The polymer was injection molded at a melt temperature of about 270° C. to make a preform, which was then subjected to the stretch-blow molding process at 102° C. in the same equipment without complete cooling. The conditions of the stretch-blow molding process were previously optimized for PET, and may, therefore, have been less than optimum for the polymers of Examples 1 and 2 that were molded under these conditions.

Analytical and Test Data

Analytical data relating to thermal properties and monomer unit compositions of the polymers are presented in Table 1. The monomer unit compositions of the polymers of Examples 1 and 2 were measured by NMR. The amounts of the monomers in the NMR analyses in Examples 1 and 2 were normalized to 100%. The PET control is a commercial bottle resin having the following composition: 48.3 mole % terephthalic acid, 1.7 mole % isophthalic acid, 1.25 mole % diethylene glycol, 48.75 mole % ethylene glycol. The composition measured by NMR is 48.7 mole % terephthalic acid, 1.3 mole % isophthalic acid, 48.5 mole % ethylene glycol, and 1.5 mole % diethylene glycol.

Thermal properties were measured by differential scanning calometry (DSC) at a heating rate of 10° C./min. The thermal properties that were measured include glass transition temperature, cold crystallization temperature during heating, melting temperature, crystallization temperature on cooling, and the heat of crystallization. Molding conditions for making the preforms are summarized in Table 2. Data on hot fill performance of the jars is presented in Tables 3 and 4.

In Table 3, the jars were filled with a hot liquid (water or corn syrup) at the temperature shown in the first column and were then cooled either fast or slow, as stated in the first column. In fast cooling, the jars were capped and then cooled with water. In slow cooling, the jars were allowed to cool in air at ambient temperature. The shrinkages, measured as the % decrease in volume, were measured for the jars made from the polymers of Examples 1 and 2. Jars made from the PET control polymers deformed in all the hot-fill experiments. Thus, no data are reported for jars made from the PET control polymers. The jars made from the polymers of Examples 1 and 2 mostly did not deform, but showed decreased volume due to shrinkage varying from less than 1% up to about 10% when filled at temperatures above about 92° C.

Table 4 reports data for the same hot fill experiments as in Example 3. The data in Table 4 are the shrinkage of the diameter of the neck finish (the part of the neck above the threads) after filling the jar with hot liquid and cooling the jar. Less than 2% shrinkage of the neck is desirable.

The stretch blow molded jars that were tested had the following wall thicknesses:

PET control
  Wall thickness of the bottle: 0.669 mm
  Wall thickness of the neck: 2.051 mm
Example 1
  Wall thickness of the bottle: 0.580 mm
  Wall thickness near the neck: 2.105 mm Example 2
  Wall thickness of the bottle: 0.597 mm
  Wall thickness near the neck: 2.169 mm.

Example 4

The polymer of Example 2 was dried overnight in a vacuum drier at 270° F. (132.2° C.). After drying, the moisture content was approximately 50 ppm. The dried polymer was injection molded into generic style 50.5 g preforms with a standard 43 mm VHS finish. The preforms were placed in a Sidel SBO-2/3 reheat stretch blow molding machine where they were heated to 148° C. and blown into generic 1-liter heat set containers. The mold temperature was set at 270° F. (132.2° C.) with a base temperature of 160° F. (71.1° C.). These mold conditions are the standard conditions that are used to make PET hot fill containers. Several containers were then molded at a rate of 800 bottles per hour with a dwell time in the mold of approximately 3 seconds. The mold temperature was then reduced to 200° F. (93.3° C.), and several additional bottles were again made for hot fill testing. This second set of mold conditions would not be suitable for making a hot-fill PET bottle.

The resulting bottles were first measured for diameter at four locations, for the bottle height, and for bottle overfill volume. The bottles were then tested for hot fill performance by filling them with hot water at temperatures that ranged from 185° F. (85° C.) to 205° F. (96.1° C.). After cooling the capped bottles, the shrinkage of the bottle diameters was measured at the same 4 positions on the bottles, and the changes in bottle height and volume were measured to determine the percent shrinkage and to determine if the bottles had distorted. The shrinkage for hot fill containers is preferably less than 3%.

The data for percent volume change are summarized in Table 5 for bottles obtained using a 270° F. (132.2° C.) mold and in Table 6 for bottles obtained from a 200° F. (93.3° C.) mold. Comparative data for percent volume change was also obtained for standard PET bottle resins molded under essentially the same conditions, with a mold temperature of 270° F. (132.2° C.). Twenty PET bottle samples were tested at incrementally increasing temperatures from 185.5° F., (85.3° C.) to 195° F., (90.6° C.), and the results of 4 representative tests are shown in Table 7.

It can be seen in the data of Tables 5 to 7 that the bottles containing isosorbide performed better than PET bottles, even though PET bottles had been subjected to a "heat set" to improve their performance under hot-fill conditions. By comparing Tables 5 and 6, it can also be seen that the heat set step appears to further improve the performance of the isosorbide-containing polyester bottles.

It is to be understood that the above-described embodiments are illustrative only and that modification throughout may occur to one skilled in the art. Accordingly, this invention is not to be regarded as limited to the embodiments disclosed herein.

TABLE 1

ANALYTICAL DATA

|  | PET | Ex. 1 | Ex. 2 |
|---|---|---|---|
| Polymer Composition (mole % in polymer) | | | |
| Ethylene Glycol (%) | NM | 48.3 | 46.7 |
| Isosorbide (%) | NM | 1.03 | 2.6 |
| Diethylene Glycol (%) | NM | 0.71 | 0.7 |
| Terephthalic Acid (%) | NM | 50.0 | 50.0 |
| I. V. (solid-state polymerized) (dL/g) | NM | 0.70 | 0.71 |
| DSC Analysis (10° C./min) | | | |
| Solid State Polymerized Resin | | | |
| Glass transition Temperature (° C.) | 79 | 81 | 85 |
| Cold Crystallization/Onset Temp. (° C.) | 199.5 | 185.5 | NM |
| Temp. at peak maximum (° C.) | 168.5 | 156.5 | NM |
| Fusion/onset melting Temp. (° C.) | 233.2 | 234 | 225.5 |
| Fusion/Temp. at peak maximum (° C.) | 239.8 | 236.7 | 230 |
| Fusion/End melting Temp. (° C.) | 248.9 | 256.7 | 243.9 |
| Crystallization Temp. on Cooling (° C.) | 209.8 | 202.3 | 192.8 |
| Heat of Crystallization (J/g) | 41.6 | 37.5 | 19.2 |
| Preform (460 ml) | | | |
| Glass transition Temperature (° C.) | 76.0 | 78.9 | 82.3 |
| Cold Crystallization/Onset Temp. (° C.) | 132.6 | 133.1 | 149.1 |
| Cold Cryst./Temp. at peak maximum (° C.) | 138.1 | 138.7 | 158.6 |
| Cold Cryst./End Temp. (° C.) | 153.8 | 145.7 | 172.1 |
| Fusion/Onset melting Temp. (° C.) | 222.5 | | 215.9 |
| Fusion/Temp. at peak maximum (° C.) | 246.7 | 252.0 | 239.7 |
| Fusion/End melting Temp. (° C.) | 252.3 | 258.2 | 247.5 |
| Crystallization Temp. on Cooling (° C.) | 199.2 | 209.8 | 198.5 |
| Heat of Crystallization (J/g) | 40.6 | 42.1 | 33.9 |
| Jar Walls | | | |
| Glass transition Temperature (° C.) | NM | NM | 83.2 |
| Cold Crystallizationlonset Temp. (° C.) | NM | NM | 118.7 |
| Cold Cryst./Temp. at peak maximum (° C.) | NM | NM | 141.0 |
| Cold Cryst./End Temp. (° C.) | NM | NM | |
| Fusion/Onset melting Temp. (° C.) | 215.7 | 236 | 218.2 |
| Fusion/Temp. at peak maximum (° C.) | 247.3 | 253.2 | 241.0 |
| Fusion/End melting Temp. (° C.) | 253.4 | 259.3 | 248.7 |
| Crystallization Temp. on Cooling (° C.) | 200.3 | 210.1 | 198.4 |
| Heat of Crystallization (J/g) | 40.1 | 43.1 | 33.8 |

TABLE 2

EXTRUDER OPERATING CONDITIONS

|  | PET | EX. 1 | EX. 2 |
|---|---|---|---|
| Barrel Temperatures (° C.) (Rear, Middle, Front, Nozzle) | 270 | 280 | 270 |
| Pressure 1 (kgf/cm² - sec. mm) | 110–11 | 110–17 | 100–15 |
| Pressure 2 (kgf/cm² - sec. mm) | 70–2 | 80–2 | 60–1.5 |
| Pressure 3 (kgf/cm² - sec. mm) | 50–10 | 40–10 | 40–8 |
| Shot size (kgf/cm²) | 40 | 35 | 45 |
| Screw velocity (% - sec. mm) | 60–15 | 60–25 | 60–25 |
| Speed 1 (% - sec. mm) | 90–10 | 90–20 | 99–20 |
| Speed 2 (% - sec. mm) | 70–9 | 70–11 | 80–15 |
| Speed 3 (% - sec. mm) | 60–11 | 60–9 | 70–10 |

TABLE 3

% VOLUME SHRINKAGE OF 460 ml JARS
(AFTER FILLING WITH HOT LIQUID)

|  | EXAMPLE 1 | EXAMPLE 2 |
|---|---|---|
| Hot Water | (% Shrinkage - slow cooling) | (% Shrinkage - slow cooling) |
| 80° C. | NOT TESTED | 4.472 |
| 85° C. | 4.521 | 8.238 |
| 88° C. | NOT TESTED | DEFORMED |

TABLE 3-continued

% VOLUME SHRINKAGE OF 460 ml JARS
(AFTER FILLING WITH HOT LIQUID)

|  | EXAMPLE 1 | EXAMPLE 2 |
|---|---|---|
| 90° C. | 5.464 | DEFORMED |
| 92° C. | 9.773 | DEFORMED |
| Hot Water | (% Shrinkage - fast cooling) | (% Shrinkage - fast cooling) |
| 80° C. | NOT TESTED | 2.639 |
| 85° C. | 3.088 | 8.212 |
| 88° C. | NOT TESTED | DEFORMED |
| 90° C. | 7.040 | DEFORMED |
| 92° C. | 9.073 | DEFORMED |
| Hot Corn Syrup | (% Shrinkage - slow cooling) | (% Shrinkage - slow cooling) |
| 80° C. | NOT TESTED | 2.034 |
| 85° C. | NOT TESTED | 3.012 |
| 90° C. | 4.348 | 6.041 |
| 95° C. | 6.931 | DEFORMED |
| 98° C. | 9.820 | DEFORMED |
| Hot Corn Syrup | (% Shrinkage - fast cooling) | (% Shrinkage - fast cooling) |
| 80° C. | NOT TESTED | 1.474 |
| 85° C. | NOT TESTED | 1.729 |
| 90° C. | 4.215 | 8.880 |
| 95° C. | 5.072 | DEFORMED |
| 98° C. | 7.623 | DEFORMED |

TABLE 4

% SHRINKAGE OF NECK FINISH OF 460 ml JARS
(AFTER FILLING WITH HOT LIQUID)

| Hot Water | (% Shrinkage - slow cooling) | (% Shrinkage - slow cooling) |
|---|---|---|
| 80° C. | NOT TESTED | 1.512 |
| 85° C. | 1.332 | 1.402 |
| 88° C. | NOT TESTED | DEFORMED |
| 90° C. | 1.062 | DEFORMED |
| 92° C. | 1.532 | DEFORMED |
| Hot Water | (% Shrinkage - fast cooling) | (% Shrinkage - fast cooling) |
| 80° C. | NOT TESTED | 1.402 |
| 85° C. | 0.851 | 1.402 |
| 88° C. | NOT TESTED | DEFORMED |
| 90° C. | 1.132 | DEFORMED |
| 92° C. | 1.252 | DEFORMED |
| Hot Corn Syrup | (% Shrinkage - slow cooling) | (% Shrinkage - slow cooling) |
| 80° C. | NOT TESTED | 1.282 |
| 85° C. | NOT TESTED | 0.952 |
| 90° C. | 0.681 | 1.651 |
| 95° C. | 0.911 | DEFORMED |
| 98° C. | 0.731 | DEFORMED |
| Hot Corn Syrup | (% Shrinkage - fast cooling) | (% Shrinkage - fast cooling) |
| 80° C. | NOT TESTED | 1.412 |
| 85° C. | NOT TESTED | 1.452 |
| 90° C. | 1.002 | 1.312 |
| 95° C. | 1.112 | DEFORMED |
| 98° C. | 0.902 | DEFORMED |

TABLE 5

Hot-Fill Bottle Performance of Ex. 2 Polymer (270° F. Mold)

| Hot-Fill Temperature ° F. (° C.) | No. of Samples | Volume Change % | Standard Deviation % |
|---|---|---|---|
| 185 (85) | 10 | −0.8 | 0.2 |
| 195 (90.6) | 10 | −1.3 | 0.2 |
| 200 (93.3) | 10 | −2.1 | 0.4 |
| 205 (96.1) | 10 | −3.7 | 0.7 |

TABLE 6

Hot Fill Bottle Performance of Ex. 2 Polymer (200° F. Mold)

| Hot Fill Temperature ° F. (° C.) | No. of Samples | Volume Change % | Standard Deviation % |
|---|---|---|---|
| 195 (90.6) | 10 | −2.2 | 0.3 |
| 200 (93.3) | 10 | −5.0 | 0.7 |
| 205 (96.1) | 4 | −5.6 | 0.5 |

TABLE 7

Comparative PET Bottle Performance (270° F. Mold)

| Hot-Fill Temperature, ° F. (° C.) | No. of Samples | Volume Change % |
|---|---|---|
| 185.5 (85.2) | 1 | −2.04 |
| 189.6 (87.6) | 1 | −2.46 |
| 192 (88.9) | 1 | −3.43 |
| 195 (90.6) | 1 | −4.63 |

What is claimed is:

1. A container comprising a polyester, wherein said polyester comprises terephthaloyl moieties; optionally, one or more other aromatic diacid moieties; ethylene glycol moieties; isosorbide moieties; and, optionally one or more other diol moieties, wherein said polyester has an inherent viscosity of at least about 0.35 dL/g when measured as a 1% (weight/volume) solution of said polyester in o-chlorophenol at a temperature of 25° C.

2. The container according to claim 1, wherein said terephthaloyl moieties are derived from terephthalic acid or dimethyl terephthalate.

3. The container according to claim 1, wherein the polyester further comprises diethylene glycol moieties.

4. The container according to claim 1, wherein said one or more other diol moieties are derived from aliphatic alkylene glycols or branched aliphatic glycols having from 3–12 carbon atoms and having the empirical formula HO—$C_nH_{2n}$—OH, where n is an integer from 3–12; cis or trans-1,4-cyclohexanedimethanol or mixtures thereof; triethylene glycol; 2,2-bis[4-(2-hydroxyethoxy)phenyl] propane; 1,1-bis[4-(2-hydroxyethoxy)-phenyl] cyclohexane; 9,9-bis[4-(2-hydroxyethoxy)phenyl]fluorene; 1,4:3,6-dianhydromannitol; 1,4:3,6-dianhydroiditol; or 1,4-anhydroerythritol.

5. The container according to claim 4, wherein said one or more other diol moieties are derived from cis-1,4-cyclohexanedimethanol, trans-1,4-cyclohexanedimethanol, or mixtures thereof.

6. The container according to claim 1, wherein said optional one or more other aromatic diacid moieties are derived from isophthalic acid, 2,5-furandicarboxylic acid, 2,5-thiophenedicarboxylic acid, 2,6-naphthalenedicarboxylic acid, 2,7-naphthalenedicarboxylic acid, or 4,4'-bibenzoic acid.

7. The container according to claim 6, wherein said one or more other aromatic diacid moieties are derived from isophthalic acid, 2,6-naphthalenedicarboxylic acid, 4,4'-bibenzoic acid, or mixtures thereof.

8. The container according to claim 1, wherein said inherent viscosity is at least about 0.50 dL/g.

9. The container according to claim 8, wherein said inherent viscosity at least about 0.70 dL/g.

10. The container according to claim 1, wherein said terephthaloyl moieties are present in an amount of from about 40 to about 50 mole % of said polyester, said other aromatic diacid moieties are present in an amount up to about 10.0 mole % of the polyester, said ethylene glycol moieties are present in an amount of from about 28 to about 49.75 mole % of said polyester, said isosorbide moieties are present in an amount of from about 0.25 to about 12.0 mole % of said polyester, and said other diol moieties are present in an amount of up to about 10.0 mole % of said polyester.

11. The container according to claim 10, wherein said other diol moieties are diethylene glycol moieties in an amount up to about 5.0 mole % of said polyester.

12. The container according to claim 1, wherein said container may be filled with liquid at a temperature of at least about 60° C.

13. The container according to claim 12, having a decrease in volume less than about 3%.

14. The container according to claim 12, wherein said container may be filled with liquid at a temperature of at least about 88° C.

15. The container according to claim 14, having a decrease in volume less than about 3%.

16. The container according to claim 1, wherein said container is a narrow-necked bottle or wide-mouth jar.

17. The container according to claim 1, wherein said isosorbide moieties are present in an amount of from about 1 mole % to about 6 mole % of the polyester.

18. The container according to claim 17, wherein said isosorbide moieties are present in an amount of from about 1 mole % to about 3 mole % of the polyester.

19. A method of making a container, wherein the container comprises a polyester, said method comprising:

a) forming the polyester; and b) preparing the container;

wherein the polyester comprises terephthaloyl moieties; and, optionally, other aromatic diacid moieties; ethylene glycol moieties, isosorbide moieties; and, optionally, other diol moieties; wherein said polyester has an inherent viscosity of at least about 0.35 dL/g when measured as a 1% (weight/volume) solution of said polyester in o-chlorophenol at a temperature of 25° C.

20. The method according to claim 19, wherein forming the polyester comprises:

(a) combining in a reactor a monomer comprising a terephthaloyl moiety; optionally, one or more other monomers containing an aromatic diacid moiety; a monomer comprising an ethylene glycol moiety; a monomer comprising an isosorbide moiety; and optionally, one or more other monomers comprising a diol moiety with a condensation catalyst suitable for condensing aromatic diacids and glycols; and (b) heating said monomers and said catalyst to a temperature sufficient to polymerize said monomers into a polyester polymer having at least a terephthaloyl moiety, ethylene glycol moiety and isosorbide moiety, wherein said heating is continued for a sufficient time to yield a polyester having an inherent viscosity of at least about 0.35 dL/g when measured as a 1% (weight/volume) solution of said polyester in o-chlorophenol at a temperature of 25° C.

21. The method according to claim 20, wherein heating said monomers further includes stirring said monomers with the concurrent removal of by-products by distillation and/or evaporation.

22. The method according to claim 20, wherein said monomer comprising a terephthaloyl moiety is terephthalic acid.

23. The method according to claim 22, wherein water and unreacted monomer are removed while said monomers polymerize.

24. The method according to claim 20, wherein said monomer comprising a terephthaloyl moiety is dimethyl terephthalate.

25. The method according to claim 24, wherein methanol and unreacted monomer are removed while said monomers polymerize.

26. The method according to claim 19, wherein said one or more optional other diol moieties are derived from aliphatic alkylene glycols or branched aliphatic glycols having from 3–12 carbon atoms and having the empirical formula HO—$C_nH_{2n}$—OH, where n is an integer from 3–12; cis or trans-1,4-cyclohexanedimethanol or mixtures thereof; triethylene glycol; 2,2-bis[4-(2-hydroxyethoxy)phenyl]propane; 1,1-bis[4-(2-hydroxyethoxy)phenyl]cyclohexane; or 9,9-bis[4-(2-hydroxyethoxy)phenyl]-fluorene.

27. The method according to claim 19, wherein said optional other aromatic diacid moieties are derived from isophthalic acid, 2,5-furandicarboxylic acid, 2,5-thiophenedicarboxylic acid, 2,6-naphthalenedicarboxylic acid, 2,7-naphthalenedicarboxylic acid, or 4,4'-bibenzoic acid.

28. The method according to claim 19, wherein said terephthaloyl moieties are present in an amount of about 40 to 50 mole % of said polyester, said one or more optional other aromatic diacid moieties are present in an amount up to about 10 mole % of said polyester, said ethylene glycol moieties are present in an amount of about 28 to 49.75 mole % of the polyester, said isosorbide moieties are present in an amount of about 0.25 to 20.0 mole % of said polyester, and said one or more other diol moieties are present in an amount up to about 10.0 mole % of said polyester.

29. The method according to claim 28, wherein said one or more other diol moieties comprise diethylene glycol moieties in an amount of up to about 5.0 mole % of said polyester.

30. The method according to claim 20, further comprising increasing the molecular weight of said polyester by solid state polymerization.

31. The method according to claim 30, wherein said solid state polymerization comprises:
(a) crystallizing said polyester by heating said polyester at a temperature in the range of about 115° C. to about 140° C.; and
(b) heating said polyester under vacuum or in a stream of inert gas at an elevated temperature above 140° C. but below the melting temperature of said polyester to yield a polyester having an increased inherent viscosity.

32. The method according to claim 31, wherein said heating step (b) is carried out at a temperature of about 195° to 198° C. for about 10 hours.

33. The method according to claim 31, wherein said increased inherent viscosity is at least about 0.65 dL/g.

34. The method according to claim 19, wherein preparing the container comprises extruding, injection molding, stretch-blow molding, injection blow molding or thermoforming the polyester to form the container.

35. The method according to claim 34, wherein preparing the container comprises stretch-blow molding the container.

36. The method according to claim 19, further comprising filling the container, wherein the container is hot-filled or cold-filled.

* * * * *